Patented Apr. 26, 1932

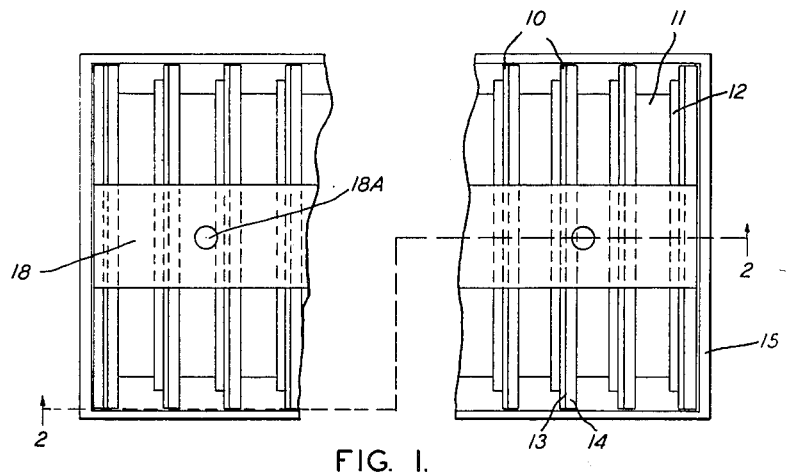
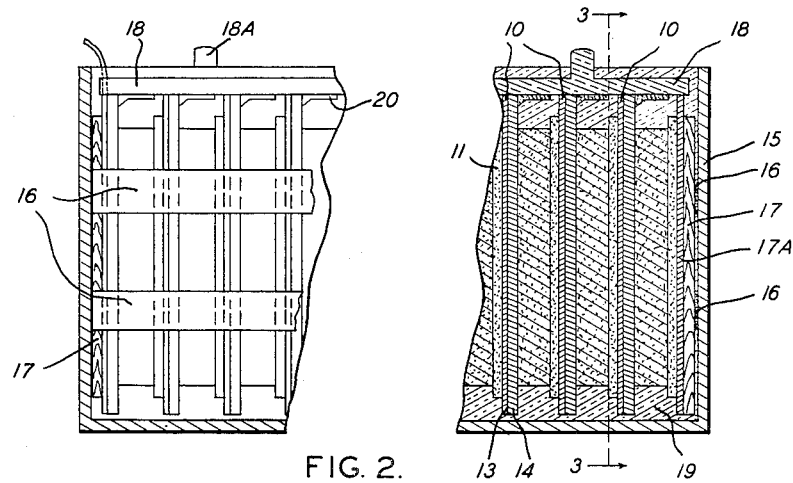
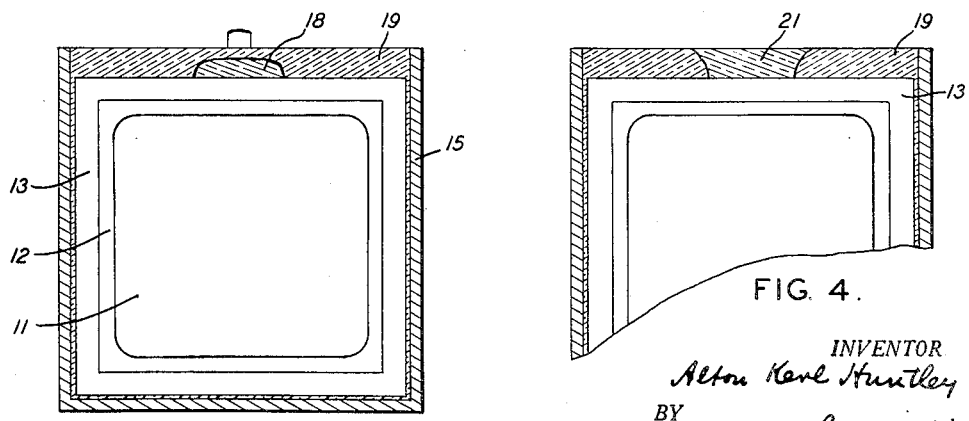

1,855,677

UNITED STATES PATENT OFFICE

ALTON KARL HUNTLEY, OF CLEVELAND, OHIO, ASSIGNOR TO NATIONAL CARBON CO., INC., A CORPORATION OF NEW YORK

DRY CELL BATTERY

Application filed August 9, 1927. Serial No. 211,769.

The invention relates to dry cells, and more particularly to batteries of dry cells of the flat type.

The principal object of the invention is to provide an inexpensive means for venting gases generated within batteries of flat type cells either on shelf or in service. Another object is to provide a venting means which can be easily incorporated into the battery assembly with a minimum of hand operations or as a part of the seal pouring step.

I have found that capillary passages may be established between the interior of the battery and the atmosphere so as to bring about controlled venting by forming portions of the encasing walls of a sealing material possessing capillary porosity, and providing paths for passage of the gases from the vicinity of the active surfaces of the electrodes, where the major portion of the gases arising within the battery are produced, to the porous portions of the seal. The invention also includes the use of novel means for leading the gas from the interior of the battery directly to the atmosphere.

In the drawings:

Fig. 1 is a top plan view of a battery assembly with the seal removed but with one embodiment of the means for leading the gases to the atmosphere shown in place on the battery assembly.

Fig. 2 is a longitudinal view on the line 2—2 of Fig. 1 showing one-half of the battery assembly in section and the other half in side elevation.

Fig. 3 is a sectional view taken on the line 3—3 of Fig. 2.

Fig. 4 is a cross sectional view of a battery similar to the one illustrated in the preceding figures, taken on a line representing a similar point in the battery as is represented by Fig. 3, and showing a modification of the venting means.

The battery shown in the drawings comprises a plurality of "Duplex" electrodes 10, mix cakes 11 and bibulous spacers 12 associated in a compact assembly to form a multicell battery of the flat type such as is disclosed in U. S. Patent to Rider and Huntley, No. 1,508,987. Each of the so-called "Duplex" electrodes comprises a plate or strip of zinc 13 provided with a coating 14 of a carbon-containing plastic possessing electrically conductive properties.

The battery assembly may be built up directly within the battery container 15 or formed into a unitary assembly outside the container and then inserted therein. The latter procedure is indicated as having been followed in Fig. 2, in which 16 are strips of a suitable paper tape used to bind the assembly. Wooden end boards 17 are shown. One end electrode is also shown as consisting of a plain uncoated zinc plate 17a. According to the modification illustrated in Figures 1, 2 and 3, before the assembly is placed within the container 15, a bar 18 with two extending horns 18a of the same material as the bar is attached to the edges of the duplex electrodes of the undipped assembly.

The bar and horns thereon may consist of any material having the desired porosity, and adequate resistance to the temperature of the pour. The base is sufficiently low to permit it to be completely covered by the seal compound.

In order to insure good contact with the upper edge portions of each of the electrodes the bottom of the bar may be coated with a thin layer of a suitably porous adhesive which is prepared by mixing a porous filler in a suitable liquid vehicle. This vehicle may consist of about 20 parts of boiled linseed oil to 100 parts by weight of rosin, heated together. A porous filler which may consist of 2 parts by weight of ground pumice to 1 part of diatomaceous earth commonly called Sil-O-Cel is incorporated to a proportion which may vary according to requirements; 75 to 150 parts of filler to 100 parts by weight of vehicle having been used successfully.

It is considered good practice, in attaching this bar to the assembly to first place it in approximately the proper position in contact with the electrode edges and then slide it endwise a short distance so that the adhesive will be slightly scraped by the edges of the zincs and thus pile up against the coating sides of the duplex electrodes. The porous adhesive 20 is thus distributed over a greater area of the electrode coating and serves a dual purpose in affording an improved mechanical bonding between the bar and the elements of the assembly, and in furnishing increased porous area for the flow of gas from the electrode coating to the bar.

After the bar 18 is suitably attached the entire assembly and bar are dipped in the usual compound, the dipped assembly is inserted in the container 15 and the usual sealing plastic 19 is added.

The sealing plastic is poured over the assembly and caused to flow into the spaces around the bottom and sides of the assembly so as to completely surround it with the exception of the horns 18a of the bar 18. These horns appear as proturberances covered with dipping compound. They are cut off level with the seal so that the bare surfaces of the bar material are exposed to act as the eventual outlets for the vented gases.

According to the modification shown in Fig. 4 the bar 18 is omitted and the seal 19 is poured in the usual way and amount. After the seal has set a portion is removed so as to form a groove extending at right angles to the duplex electrode elements and exposing portions of their upper edges. The groove is then filled with a porous composition 21, which may be prepared by melting paraffin or napthalene together in the approximate proportions of 60 parts by weight of paraffin to 40 of napthalene. A satisfactory composition of somewhat greater mechanical strength consists, in parts by weight, of paraffin 60, napthalene 30, and Montan wax 10. Such a mixture when molten can be poured directly into the groove, but it is generally more satisfactory to fill the groove with a mineral filler, such as sand or bentonite, prior to pouring in the molten porous plastic.

Another modification of substantially this same construction is one in which the groove is made sufficiently wide to take in the entire top of the assembly. In this type of construction the assembly may be dipped and the top edges cleaned prior to pouring in the seal, or an undipped assembly may be used. In both cases the non-porous seal 19 is brought up practically to but not above the level of the electrode tops, and the remainder of the casing filled with the porous seal 21. Mineral filler, such as sand or bentonite, is especially desirable with this construction in order to promote the mechanical strength of the porous top seal.

The gases which are generated within dry cell batteries of the flat type tend to be forced to the peripheral portions of the cells and their passage is facilitated by the presence of minute air spaces which occur at the interfaces between the seal and those portions of the battery assembly with which the seal comes into contact. Accordingly, by bringing the porous plastic material 21 or the porous bar 18 into contact with the upper edge portions of the duplex electrode elements communication is established with such minute air spaces as occur at the interfaces between the seal and the sides of those portions of the electrode elements which are in proximity to the porous venting means 18 or 21 as the case may be. The carbonaceous coating 14 is also reasonably permeable to gases and therefore functions as a conduit for leading gases to the porous venting member. Even though the greater portion of the gases are generated in the vicinity of the zinc surfaces of the electrode elements, a considerable portion of the gases which are vented probably are led to the carbonaceous coating by way of the minute air spaces occurring at the interface between the seal 19 and the edge areas of the mix cake 11.

The width and thickness of the venting portion 21 of the seal or venting member 18 may be varied depending upon the porosity of the material used and upon the venting capacity desired. Such venting capacity is controlled within certain predetermined limits, these varying in accordance with the size and other characteristics of the cell.

I claim:

1. A dry cell battery comprising a plurality of flat electrode elements arranged in spaced relation, depolarizing mix in the spaces between said elements and spaced from certain of said elements, by bibulous spacing members, a porous member resting upon a peripheral edge portion of each of said elements and attached firmly thereto by a porous adhesive, said adhesive being permeable to gases and plastic sealing material encasing the cell assembly and embedding said porous member but leaving a portion thereof exposed to the atmosphere.

2. A dry cell battery comprising a plurality of spaced electrode members, depolarizing members between said electrode members, a porous venting member resting upon said electrode members and secured thereto by a porous adhesive, and a sealing means enclosing said electrode members and depolarizing members, said porous venting member extending, at least in part, through said sealing means.

In testimony whereof, I affix my signature.

ALTON KARL HUNTLEY.